(12) United States Patent
Harmon et al.

(10) Patent No.: US 7,435,093 B1
(45) Date of Patent: Oct. 14, 2008

(54) NOSEBOX FOR INTERCHANGEABLE CONNECTOR ASSEMBLIES FOR TRACTORS AND TRAILERS

(75) Inventors: Darren L. Harmon, Madison, IN (US); Mark D. Noe, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 12/025,335

(22) Filed: Feb. 4, 2008

(51) Int. Cl.
*H01R 33/00* (2006.01)

(52) U.S. Cl. ........................................ 439/35

(58) Field of Classification Search ................... 439/34, 439/35
See application file for complete search history.

(56) References Cited

U.S. PATENT DOCUMENTS

| | | | | |
|---|---|---|---|---|
| 5,443,389 A | * | 8/1995 | Hughes | 439/35 |
| 5,488,352 A | * | 1/1996 | Jasper | 340/431 |
| 5,739,592 A | * | 4/1998 | Rigsby et al. | 307/9.1 |
| 6,007,346 A | * | 12/1999 | Gutierrez et al. | 439/35 |
| 6,450,833 B1 | | 9/2002 | Brown, Jr. et al. | |
| 6,558,167 B2 | | 5/2003 | Harmon et al. | |
| 6,749,438 B1 | * | 6/2004 | Scheller et al. | 439/35 |
| 7,331,792 B2 | * | 2/2008 | Cummings et al. | 439/35 |

* cited by examiner

*Primary Examiner*—Briggitte R Hammond
(74) *Attorney, Agent, or Firm*—Woodard, Emhardt, Moriarty, McNett & Henry LLP (57) ABSTRACT

A nosebox assembly for making electrical connection between a tractor and a trailer comprises a nosebox housing with an interchangeable connector assembly and a terminal plate assembly, both configured to mountable within the nosebox housing. The interchangeable connector assembly includes a plurality of primary conducting pins extending therefrom and configured as a socket, each of the pins being adapted to receive connection to a circuit. The interchangeable connector assembly is detachably mounted inside the nosebox housing and is easily removable for repair or replacement. The terminal plate assembly includes a plurality of secondary conducting pins extending therefrom. Additionally, the terminal plate assembly includes a plurality of auxiliary pins extending therefrom to provide additional connection points to the circuits received from the primary conducting pins. The assembly further includes an electrical connecting assembly electrically connecting the primary conducting pins and the secondary conducting pins.

24 Claims, 11 Drawing Sheets

NOSEBOX FOR INTERCHANGEABLE CONNECTOR ASSEMBLIES FOR TRACTORS AND TRAILERS

FIELD OF THE INVENTION

The present invention relates generally to systems for interfacing electrical power and electronic communications between a tractor and a trailer, and more specifically to a nosebox having interchangeable connector assemblies.

BACKGROUND OF THE INVENTION

For the past few decades, the freight hauling industry has relied on a tractor/trailer combination for hauling cargo over long distances. These combinations consist of a tractor that is mechanically coupled to a trailer so it can pull the trailer and its cargo. Because the trailer typically has no power source or control mechanisms, it is necessary to supply power and communicate control signals via a subsystem link from the tractor to the trailer for the proper functioning of the tractor/trailer combination. Since a tractor is not permanently linked to a specific trailer, it is desirable that this subsystem link comply with relevant industry standards in order for a tractor to be compatible with different trailers.

Electrical power exchange between a tractor and trailer is currently accomplished via a seven wire cable and an associated seven pin connector. This electrical connection system, capable of carrying seven separate circuits, provides electrical power for various trailer lighting functions such as turn signals, brake lamps, tail lamps, side marker lamps, clearance lamps and dome lamps, as well as a ground reference for these electrical circuits. In an effort to provide uniformity throughout the industry, the Society of Automotive Engineers (SAE) has promulgated standards for both the seven wire cable (SAE-J1067) and the associated seven pin connectors (SAE-J560b).

As used hereinafter, the term "tractor" refers to any vehicle having another vehicle in tow, and therefore includes medium or heavy duty trucks, tractor trucks and tractor truck/trailer combinations having a further vehicle or vehicles in tow. The term "trailer" as used hereinafter refers to any vehicle towed by another vehicle, and therefore includes semi-trailers, and the like.

Figure 1:
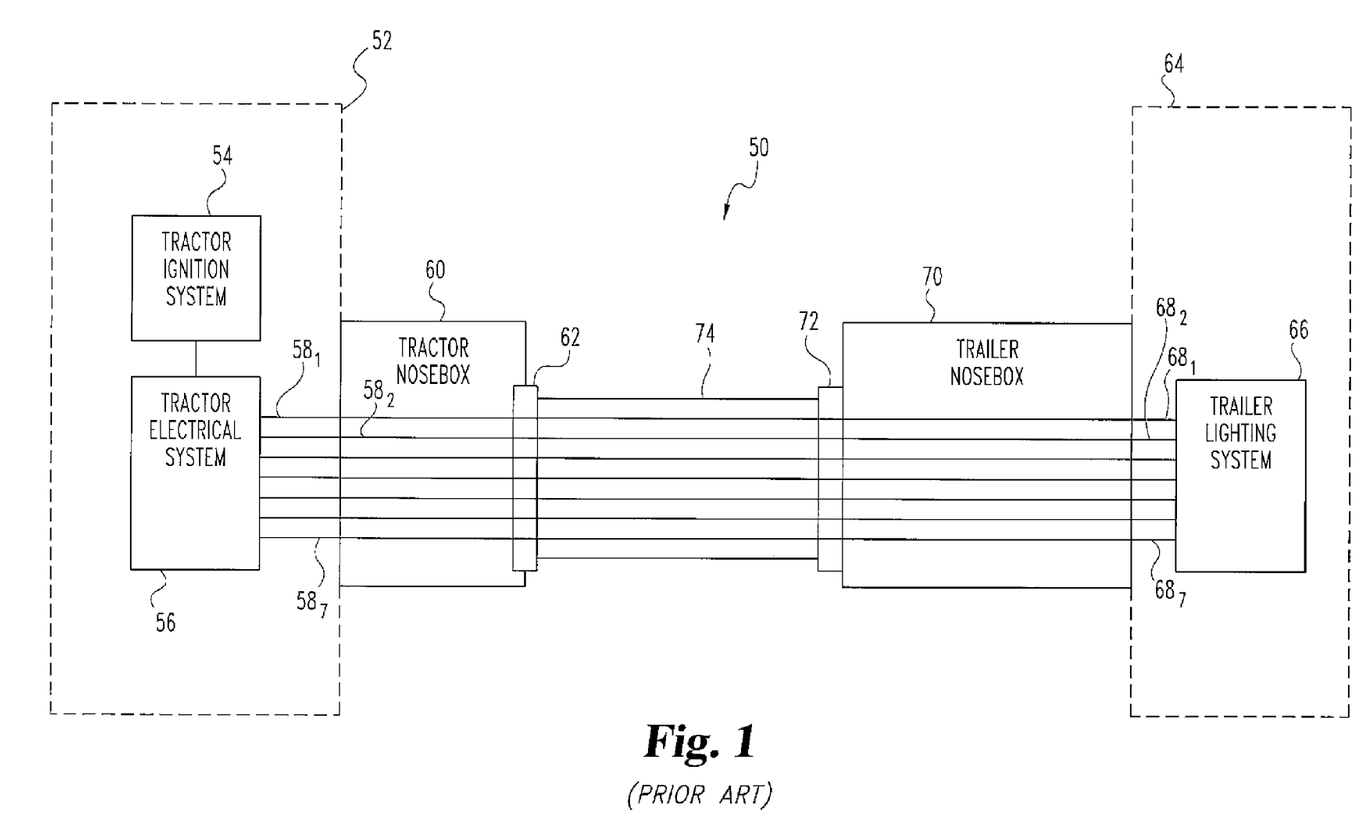
FIG. 1 is a diagrammatical illustration of a prior art electrical interface between a tractor electrical system and a trailer electrical system.

Referring to FIG. 1, a diagram of a typical prior art electrical connection system 50 for routing electrical power to an electrical trailer system is shown. A tractor 52 includes a tractor power system 54 which acts as a power source to provide electrical power to a tractor electrical system 56 when the tractor 52 is in operation. Connected to tractor electrical system 56 are seven electrical lines $58_1, 58_2, \ldots 58_7$, which are configured in accordance with SAE-J1067 standards. Electrical lines $58_1, 58_2, \ldots 58_7$ extend from tractor electrical system 56 into a connector housing 60, commonly referred to as a "tractor nosebox", which is typically attached to an exterior surface of tractor 52. Housing 60 has a seven conductor electrical connector 62 associated therewith, and electrical lines $58_1, 58_2, \ldots 58_7$ are connected thereto in accordance with SAE-J560b standards.

A trailer 64 includes a trailer electrical system 66 which is operable to provide the aforementioned trailer functions. Connected to trailer electrical system 66 are seven electrical lines $68_1, 68_2, \ldots 68_7$ which are configured in accordance with SAE J-1067 standards. Electrical lines $68_1, 68_2, \ldots 68_7$ extend from trailer electrical system 66 into a connector housing 70, or "trailer nosebox", which is typically attached to an exterior surface of trailer 64. Housing 70 has a seven conductor electrical connector 72 associated therewith, to which electrical lines $68_1, 68_2, \ldots 68_7$ are connected in accordance with SAE-J560b standards.

A seven conductor connector/cable 74, or "power cord", connects tractor electrical connector 62 to trailer electrical connector 72 so that the tractor electrical system 56 controls, and provides electrical power to, the trailer electrical system 66.

Figure 2:
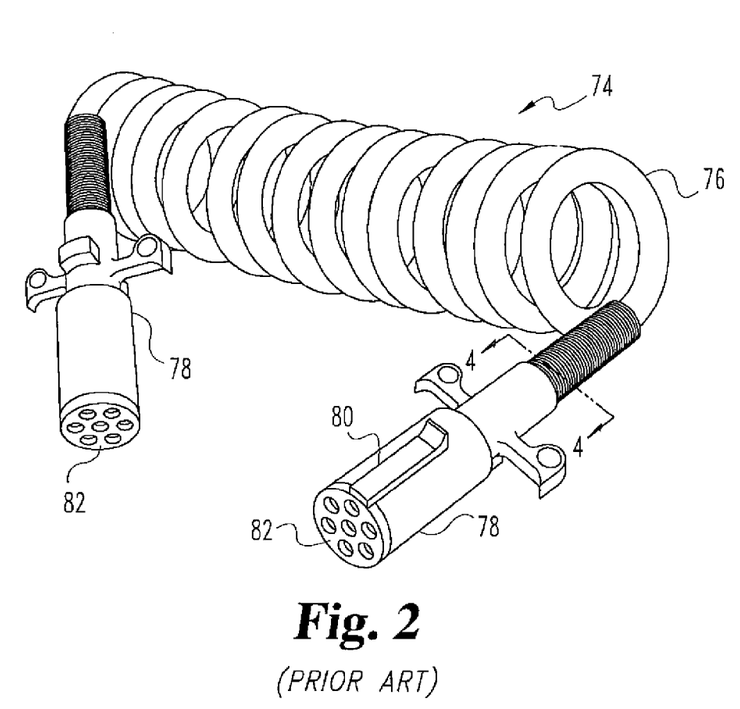
FIG. 2 is a perspective view of a prior art seven conductor electrical cable with plug connectors for use as an electrical interface between a tractor and a trailer.
Figure 3:
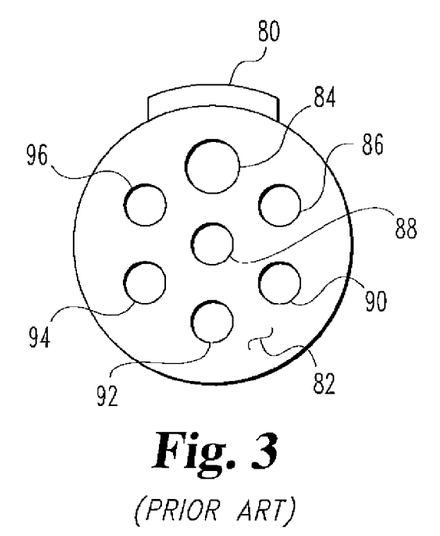
FIG. 3 is a front elevational view of a prior art seven terminal plug connector for use with the prior art seven conductor electrical cable of FIG. 2.

Referring now to FIG. 2, a typical power cord 74 is shown. Power cord 74 includes an SAE-J1067 seven wire jacketed cable 76 with an SAE-J560b seven conductor plug connector 78 connected thereto at each end. Each plug connector 78 has a front face 82 and a socket guide 80 extending away from the front face 82. FIG. 3 shows the front face 82 of plug connector 78 which defines seven receptacles, or electrical terminals 84-96, therein, each of which forms an electrical connection with one of the seven wires contained within cable 76. The sizing and color standard of the seven circuit wires are set forth in SAE-J1067.

Figures 4, 5:
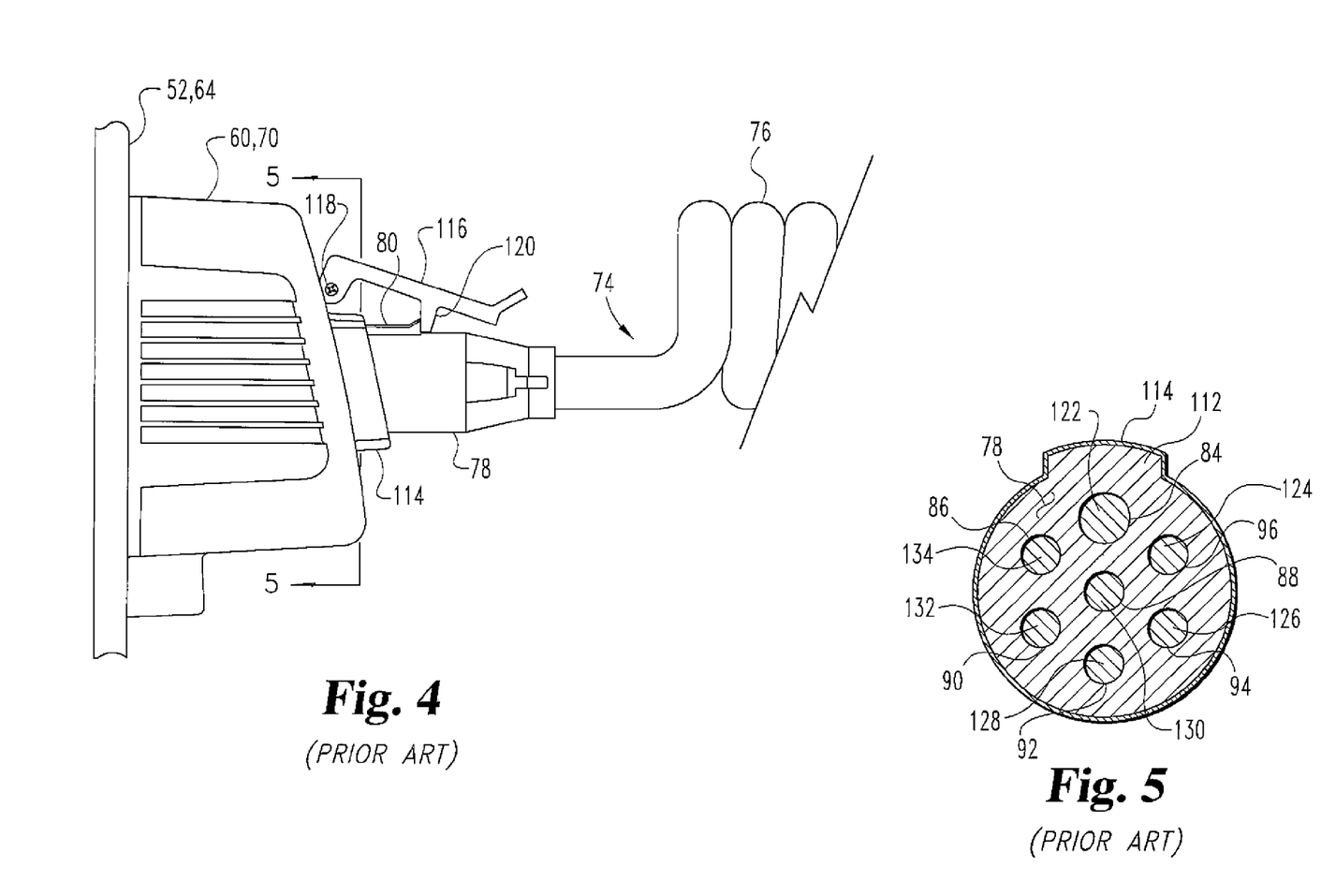
FIG. 4 is a side elevational view of an electrical connection between the prior art seven conductor electrical cable of FIG. 2 and a seven terminal electrical socket of a tractor or trailer.
FIG. 5 is a cross-sectional view of the electrical connection of FIG. 4 taken along section line 5-5 of FIG. 4.

Referring now to FIG. 4, an example of a typical electrical connection between connector housing 60 (or 70), attached to tractor 52 (or trailer 64), and power cord 74 is shown. Connector housing 60 (70) typically includes a socket cover 116 connected to housing 60 (or 70) by hinged connection 118, which is biased, such that cover 116 provides an environmentally and mechanically protecting seal over socket 114 when not in use. Socket 114 has been generally referred as electrical connector 62 (or 72) (FIG. 1.) Socket 114 is configured complementary to plug 78 of power cord 74, and includes a socket guide slot 112 (FIG. 5) such that plug 78 may be received within socket 114, having socket guide 80 align with socket guide slot 112 when cover 116 is lifted to expose socket 114. Cover 116 also typically includes a projection 120 which operates to engage socket guide 80 of plug 78, which, under the normal bias of cover 116 provided by hinged connection 118, acts to retain plug 78 within socket 114, thereby maintaining electrical connection therebetween.

FIG. 5 shows a cross-section, taken along section lines 5-5 of FIG. 4, of the electrical connection between plug 78 and socket 114. Socket 114 includes seven "pins" or electrical terminals 122-134, which are typically configured in accordance with SAE-J560b standards, and which are received within corresponding receptacle terminals 84-96 of plug 78. The specifics of the sizing and geometry standards of SAE-J1067 cable and SAE-J560b plugs and sockets are set forth in "Seven Truck-Trailer Jumper-Cable," of the 2000 SAE Handbook. Generally, for a SAE-J560b socket, the seven pins are positioned in a standard pattern such that a central pin surrounded by six pins spaced equiangularly from each other and from the center pin. Per the SAE-J560b standard, the pin located at the 12 o'clock position, in reference to the socket guide slot 112, is slightly larger in diameter than the other six standard pins. Traditionally, the pins are referred to by the color and/or function of the circuit wire to which the pins are ultimately connected, i.e. pin 122 at the 12 o'clock position is white for the main ground circuit, pin 128 at the 6 o'clock position is for the red circuit, pins 124, 126, 130, 132, 134 are black, yellow, blue, green, and brown, respectively.

Recently, technological advances in the tractor/trailer industry have created a need to provide tractors and trailers with additional electrical functions. Examples of such functions include anti-lock brakes, lift gates, and electronic suspension control, as well as diagnostic control and fault detection of various trailer functions. Furthermore, there is a desire within the industry to have the capability of providing for a parallel main harness when a double trailer hook-up is required.

The prior art interface system as described in FIG. 1 does not have the capacity to provide for the extra functions. A recent government ruling further aggravates the problem by dedicating the blue circuit to the trailer anti-lock brake system (ABS). Although provisions for additional power cables and connectors may be a viable solution in the short term, this approach is generally a costly solution since that tends to limit compatibility between tractors and trailers. Additionally, it is still generally considered desirable by owners and operators of tractor/trailer combinations to maintain the use of the universal J560b plugs, sockets and the associated J1067 power cords. However, before the universal J560/J1067 hardware standard is to be used to provide electrical interface for the added communication and power needs, two issues must be addressed. First, the system must provide the capability of loading multiple functions on one circuit. Secondly, the system must provide connection points for the added functions.

An example of a design utilizing the SAE-J1067/J560b electrical interface system to provide a connector assembly with extra terminal receptacles to provide additional connection points to the electrical circuits bridging the tractor/trailer combination is set forth in U.S. Pat. No. 6,558,167, which is assigned to the same assignee as the present invention. While this innovative circuit design may have addressed the issue of providing extra terminal receptacles allowing the added functions to connect to the circuits, there is a need for a system which provides for ease of installation, repair and/or replacement of an interchangeable connector assembly with little disruption to the electrical connections made with the extra terminal receptacles.

What is therefore needed are assemblies which are compatible with existing SAE-J1067/J506b power cords and plugs but which also permit new electrically controlled tractor/trailer functions and features to be connected to the existing circuits without additional electrical connection hardware or splicing, with certain components being easily removable, with little disruption to other components, providing the flexibility of changing a configuration or replacing a damaged unit. The present disclosure is directed toward devices and methods which meet these needs.

SUMMARY OF THE INVENTION

In one aspect of the present disclosure, a nosebox assembly for making electrical connection between a tractor and a trailer comprises separate first and second members selectively mountable within a nosebox housing, with the first member being spaced apart from the second member. The assembly includes a plurality of primary conducting pins extending from the first member and configured as a socket, with each of the primary conducting pins being adapted to receive connection to a circuit. Additionally, the assembly includes a plurality of secondary conducting pins extending from the second member, and a plurality of auxiliary pins electrically connected to the secondary conducting pins. Each of the auxiliary pins is adapted to receive a terminal connector to provide an additional electrical connection point to the circuits received by the primary conducting pins. The assembly further includes an electrical connecting assembly electrically connecting the primary conducting pins and the secondary conducting pins.

In another aspect of the present disclosure, a nosebox assembly for making electrical connection between a tractor and a trailer comprises a nosebox housing defining an interior space, a plurality of primary conducting pins at least partially disposed within the interior space and configured as a socket, a plurality of secondary conducting pins disposed within the interior space, and a plurality of auxiliary pins disposed within the interior space and electrically connected to the secondary conducting pins. Each of the primary conducting pins is adapted to receive connection to a circuit. Additionally, each of the auxiliary pins is adapted to receive a terminal connector to provide an additional electrical connection point to the circuits received by the primary conducting pins. The assembly further includes an electrical connecting assembly electrically connecting the primary conducting pins and the secondary conducting pins. The auxiliary pins are remotely positioned from the primary conducting pins within the interior space such that replacement of the primary conducting pins is without disruption to the electrical connections made with the auxiliary pins and without removal of the auxiliary pins from the interior space.

In yet another aspect of the present disclosure, a nosebox assembly for making electrical connection between a tractor and a trailer comprises an interchangeable connector, a plurality of primary conducting pins, a secondary member, a plurality of secondary conducting pins extending from the secondary member, a plurality of auxiliary pins extending from the secondary member and electrically connected to the secondary conducting pins, and an electrical connecting assembly. The interchangeable connector has a first side forming a socket portion for receiving an electrical connector plug having a plurality of plug conductors, and a second opposite side. The primary conducting pins have a primary distal end and a primary proximal end, with each of the primary distal ends being positioned within the socket for mating with an electrical connector plug having a plurality of plug conductors. The primary proximal ends extend from the second side of the interchangeable connector. Additionally, the electrical connecting assembly electrically connects the primary conducting pins and the secondary conducting pins such that each of the plurality of secondary conducting pins and each of the plurality of auxiliary pins is in electrical connection with at least one of the primary conducting pins. The assembly is configured such that when an electrical connector plug having a plurality of plug conductors is received in the socket portion, each plug conductor is electrically connected to at least one primary conducting pin, at least one secondary conducting pin, and at least one auxiliary pin.

DESCRIPTION OF THE ILLUSTRATED EMBODIMENTS

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, and alterations and modifications in the illustrated systems, and further applications of the principles of the disclosure as illustrated therein are herein contemplated as would normally occur to one skilled in the art to which the disclosure relates.

The present disclosure is directed to a nosebox assembly including a nosebox housing, an interchangeable connector assembly having a plurality of primary conducting pins extending therefrom and a terminal plate assembly having a plurality of secondary conducting pins and a plurality of auxiliary pins extending therefrom. In the illustrated embodiment, each of the primary conducting pins is adapted to receive connection to a circuit and the auxiliary pins are adapted to receive terminal connectors providing additional electrical connection points to the circuits received by the primary conducting pins. The nosebox assembly further includes an electrical connecting assembly electrically connecting the primary conducting pins and the secondary conducting pins.

FIGS. 6-13 illustrate an electrical connector housing or nosebox assembly 150 according to an embodiment of the present disclosure. Nosebox assembly 150 includes a housing 152 with an interchangeable connector assembly 202 and terminal plate assembly 302 selectively mounted therein. Housing 152 is specifically designed to house the interchangeable connector and terminal plate assemblies and is also adapted to securely attach to either a tractor or a trailer.

Figure 6:
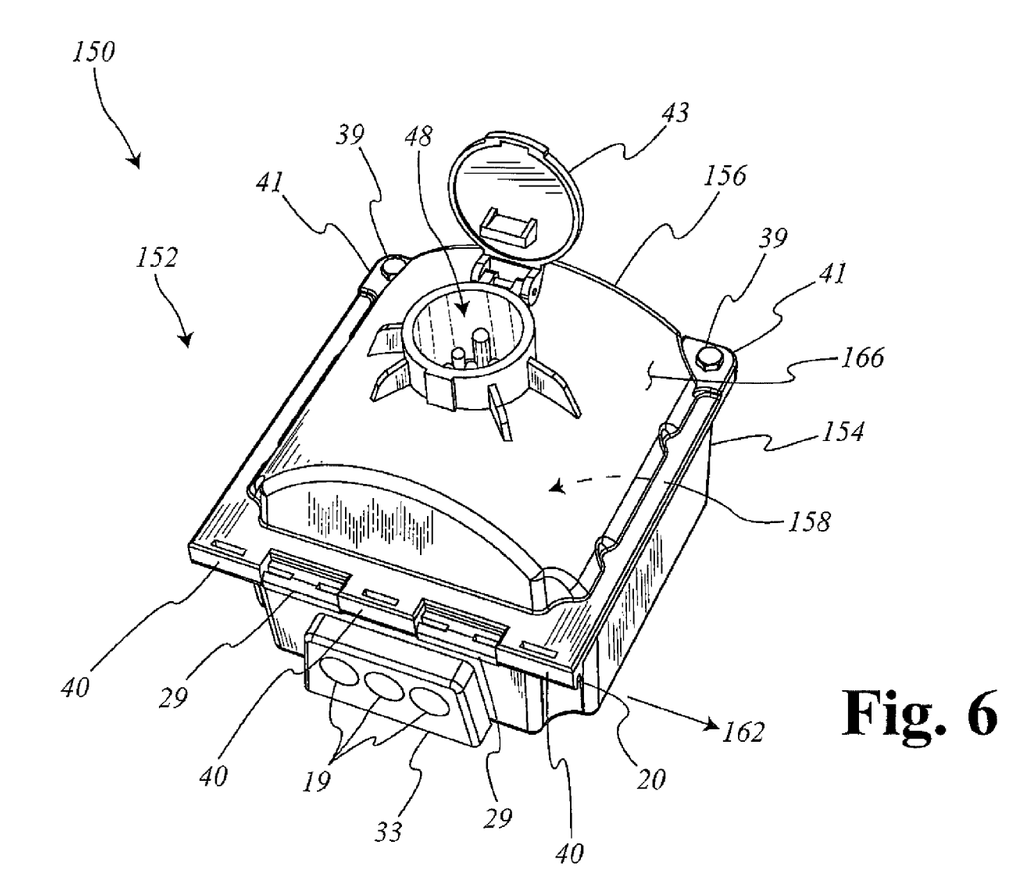
FIG. 6 is a perspective view of a nosebox assembly of the present disclosure.

FIG. 6 shows the exterior of one embodiment of a nosebox housing 152. Housing 152 is sized to accommodate interchangeable connector assembly 202 and terminal plate assembly 302, and the associated electrical cables (not shown) making connections with the assemblies. With the expanded number of connection positions available via terminal plate assembly 302, it is likely that the number of cables will exceed the size and number (7) proscribed by the SAE-J560b/J1067 standards. Nosebox housing 152 includes a tray member 154 and a cover member 156, together defining an interior space 158 therebetween. Cover member 156 is hingeably engaged to tray member 154 by a hinge rod 20 threading alternatively through hinge members 40 and 29 of cover member 156 and tray member 154, respectively. Hinge rod 20 may be bent at one end such that it is retained in position by one of the hinge members 40 and 29 and is prevented from disengaging by the vibration of a moving vehicle.

In certain embodiments, nosebox assembly 150 is mounted to a tractor or trailer in the orientation as shown in FIG. 6, having the hinge axis 162 at the bottom such that cover member 156 opens downward. Cover member 156 may be maintained in a closed position by threading two locking screws 39 through upper corners 41 of cover member 156 into tray member 154. In some embodiments, the degree of opening of cover member 156 may be limited by shelves (not shown) disposed on tray member 154 below hinge members 29.

In the illustrated embodiment, housing 152 is generally square from a top view. In certain embodiments, housing 152 may be approximately 7.25 inches in length on each side. Additionally, as illustrated, cover member 156 may be at least partially curved such that an outside surface 166 is convex or dome-shaped to provide additional space for the associated electrical cables (not shown) making connections with the interchangeable connector and terminal plate assemblies. Additionally, the convex or dome shape of outside surface 166 provides an aerodynamic configuration to housing 152 to better enable the housing to shed water. In certain embodiments, tray member 154 is between approximately 3.5 inches to 5 inches deep. While it is shown that housing 152 is approximately square with a rounded top, other housing shapes may be utilized. It is contemplated that housing 152 may be constructed of glass filled nylon. In such embodiments, approximately 20% glass may be used, however the amount of glass may vary. Additionally, other materials which have acceptable strength, rigidity and weathering characteristics may also be used.

In the illustrated embodiment, a socket cover plate 43 is located on outside surface 166 of cover member 156. Socket cover plate 43 covers the entrance to a socket cavity 48. Socket cover plate 43 is hingeably engaged to cover member 156. Although not shown in detail in the drawings, the pivotal attachment between plate 43 and cover member 156 may be such that plate 43 is biased toward its downward (closed) position, as shown, in order to protect the socket from the environment. Additionally, tray member 154 defines an access 32 (see FIG. 7) to provide access for electrical cables to the inside of nosebox housing 152. A grommet 33 may be attached to tray member 154 adjacent to or covering access 32. In the illustrated embodiment, grommet 33 defines three holes 19 allowing for passage of the electrical cables (not shown). In some embodiments, the holes 19 may include thin member walls having precut slits to allow for the entry and exit of the cables therethrough and to provide added protection against splash and road salt from nosebox housing 152.

Figure 7:
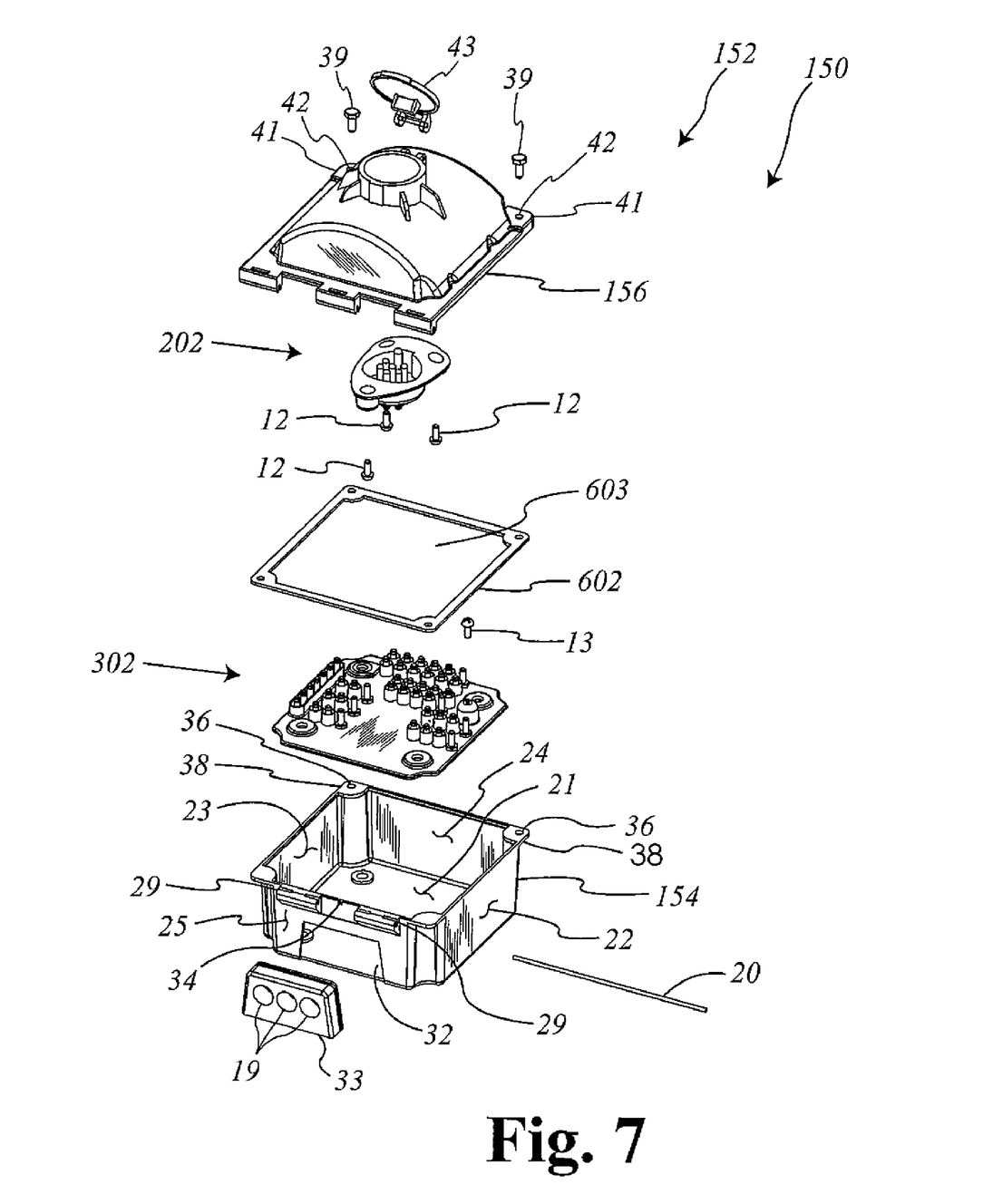
FIG. 7 is an exploded perspective view of a nosebox assembly of the present disclosure.

FIG. 7 is an exploded diagram of nosebox assembly 150, showing the assembly of interchangeable connector assembly 202 and terminal plate 302 within nosebox housing 152. Housing 152 may be assembled by placing cover member 156 over tray member 154 and juxtaposing hinge members 29 of tray member 154 against hinge member 40 of cover member 156. Hinge rod 20 is inserted through the bores of hinge members 29 and 40 thereby hingeably attaching cover member 156 to tray member 154. An interchangeable connector assembly, such as assembly 202, may be placed over socket cavity 48 and detachably mounted to an inside surface of cover member 156 via three screws 12. In certain embodiments, the interchangeable connector assembly may be easily removed for servicing or exchanging for other connector assemblies. In certain other embodiments, the interchangeable connector assembly may be non-removably mounted to cover member 156. A terminal plate assembly, such as assembly 302, may be mounted to a back surface 21 of tray member 154 via screw 13. Nosebox assembly 150 may also optionally include a gasket 602, defining an open center 603, to provide a tighter environmental seal. In certain embodiments, gasket 602 is glued to cover member 156. However, it should be appreciated that gasket 602 may be attached to cover member 156 in other manners, such as mounting the gasket with screws. In yet other embodiments, gasket 602 may be attached to tray member 154.

Tray member 154 includes right, left, top and bottom walls, 22, 23, 24, and 25, respectively, extending from back wall 21. Back wall 21 of tray member 154 includes a plurality of mounting holes 26 for receiving mounting bolts (not shown) for securing tray member 154 to a tractor or trailer. In certain embodiments, brass eyelets may be inserted in mounting holes 26 to protect tray member 154 from thread damage in the event that the mounting bolts are over-torqued. Additionally, in certain embodiments the brass eyelets may include a wide flange area such that a ring terminal can be secured on top to produce a redundant ground. In the case where water inadvertently collects inside housing member 152, a notch 34 defined at the front edge of bottom wall 25 of tray member 154 is provided to facilitate drainage.

For receiving locking screws 39 to secure cover member 156 to tray member 154, corners 38 adjacent top wall 24 are thickened such that receiving bores 36 can be included. Optionally, threaded brass inserts adapted to receive the locking screws may be placed into receiving bores 36 to reduce thread damage from repeated opening and closing of cover member 156. Additionally, cover member 156 includes corresponding bores 42 to receive locking screws 39. In the event of damage to and/or failure of the hinged engagement between tray member 154 and cover member 156, or as otherwise desired, two additional screws such as screws 39 may be used to secure cover member 156 to tray member 154, such that four total screws secure the members together. In such embodiments, two additional bores may be formed in each of tray member 154 and cover member 156, at the corners adjacent the illustrated hinged engagement, to receive the additional screws. Threaded brass inserts may also be placed in the additional bores formed in the tray member 154. In other embodiments, such additional bores are pre-drilled into the tray and cover members 154 and 156, such that each member includes four bores at the four corners.

Figure 8:
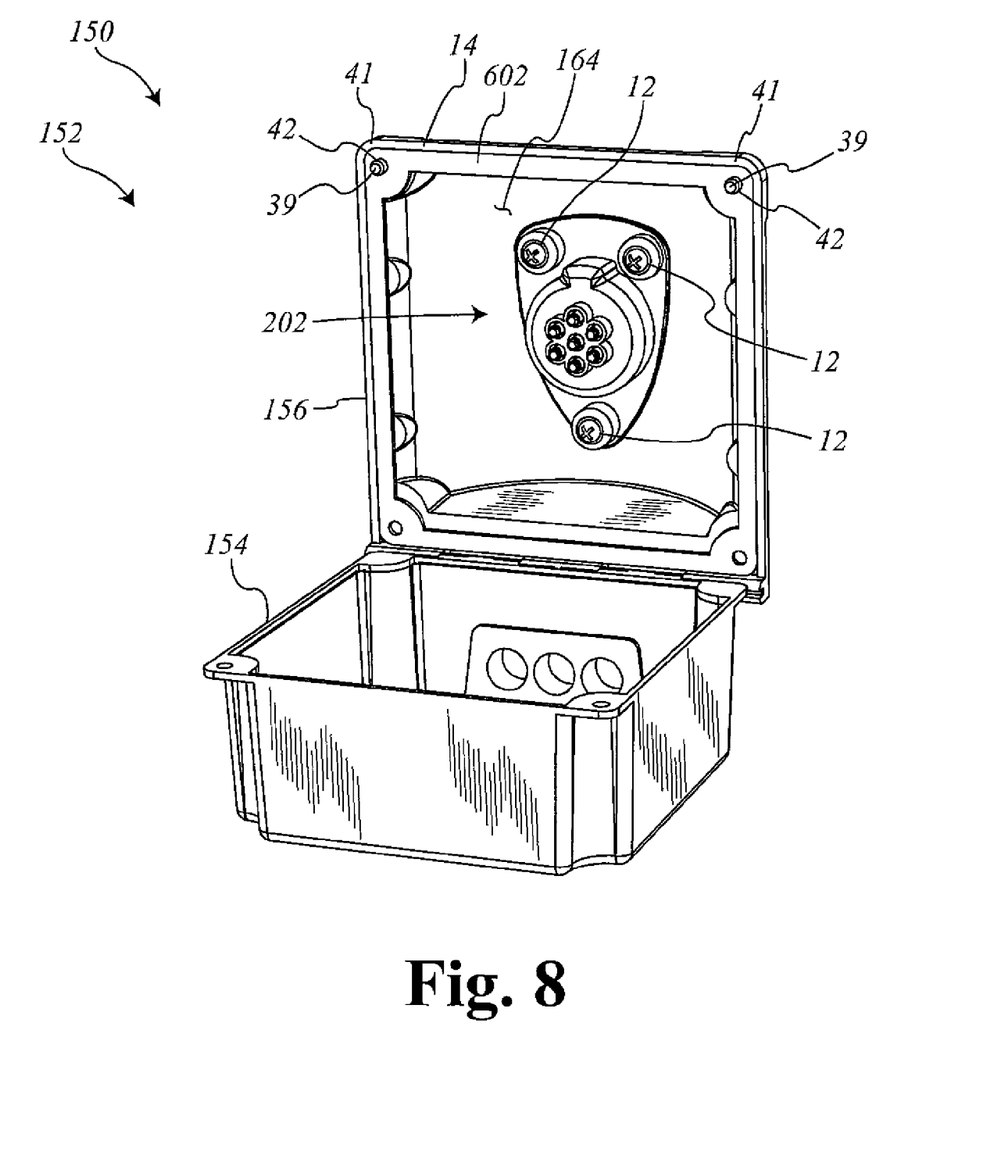
FIG. 8 is a perspective view of a nosebox assembly of the present disclosure in an opened position.

FIG. 8 illustrates a perspective view of nosebox assembly 150 as assembled and in an open position. As shown, interchangeable connector assembly 202 is selectively mounted to an inside surface 164 of cover member 156 via screws 12. In the illustrated embodiment, assembly 202 is configured to receive three screws 12 to mount assembly 202 to cover member 156. However, it should be appreciated that assembly 202 can be mounted in different ways as would occur to one skilled in the art and with more or less than three screws. Assembly 202 is mounted to cover member 156 such that the primary conducting pins associated with assembly 202 (as will be discussed in greater detail below) are accessible from outside housing 152 through socket cavity 48. In certain embodiments, a socket housing (not shown) may be formed on inside surface 164, the socket housing defining seven perforations configured in accordance with the SAE-J560b standard to allow passage of the corresponding conducting pins. In such embodiments, the socket housing may define part of socket cavity 48 configured for passage of a SAE-J560b plug connector. Additionally, receiver bosses (not shown) may also be defined on inside surface 164 to engage the interchangeable connector assembly, the bosses defining apertures for receiving fasteners, such as screws 12, thereby securing assembly 202 to cover member 156.

Cover member 156 is sized to receive tray member 154. An overhang 14 formed around the edge of cover member 156 fits over tray member 154 and prevents moisture from entering interior space 158. In certain embodiments, a gasket 602 is placed adjacent to overhang 14 providing a tighter environmental seal. Interior surface 164 includes a generally concave shape to increase the volume of interior space 158 and thus increase the space available for positioning of the electrical cables/wires (not shown) in interior space 158 when cover member 156 is closed onto tray member 154. For securing cover member 156 to tray member 154, bores 42, included at corners 41, are adapted to receive locking screws 39.

Figure 9:
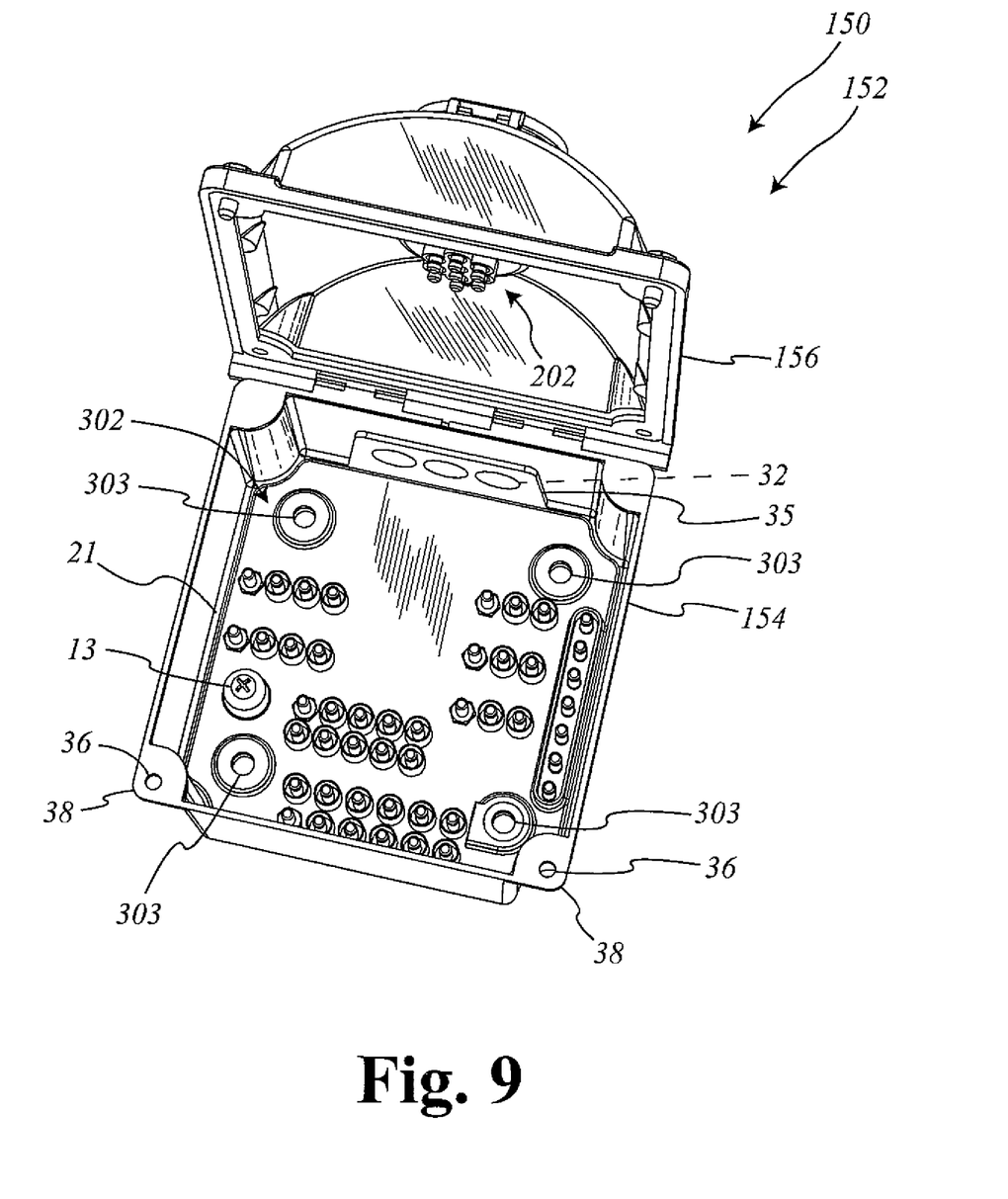
FIG. 9 is another perspective view of a nosebox assembly of the present disclosure in an opened position.

FIG. 9 illustrates another perspective view of nosebox assembly 150 as assembled and in an open position. In the illustrated embodiment, terminal plate assembly 302 is mounted to back surface 21 of tray member 154 via screw 13. However, it should be appreciated that assembly 302 can be mounted to tray member 154 in different ways as would occur to one skilled in the art. Assembly 302 is mounted to tray member 154 such that the auxiliary pins associated with assembly 302 (as will be discussed in greater detail below) are accessible via the interior space 158 of housing 152 to provide additional connection points for the circuits connected with the primary conducting pins of the assembly 202. The auxiliary pins are accessible from the outside of housing 152 via access 32 defined in tray member 154. Optionally, access 32 may be selectively covered with a guard 35 to conceal holes 19 of grommet 33 when not in use.

As illustrated, terminal plate assembly 302 may include a plurality of mounting holes 303, configured to align with the plurality of mounting holes 26 defined in back wall 21 of tray member 154, for receiving mounting bolts (not shown) for securing tray member 154 to a tractor or trailer. In such embodiments, the number of mounting holes 303 equals the number of mounting holes 26. In the illustrated embodiment, there are four mounting holes 303 and four mounting holes 26 positioned adjacent the four corners of terminal plate assembly 302 and back wall 21, respectively. However, it should be appreciated that the illustrated manner of securing tray member 154 to a tractor or trailer is only one example of a number of possible designs that would occur to one skilled in the art. Additionally, as will be discussed and illustrated in greater detail below, an electrical connecting assembly, such as a wire harness assembly as an example, electrically connects the pins of assembly 202 with the pins of assembly 302.

Figure 10:
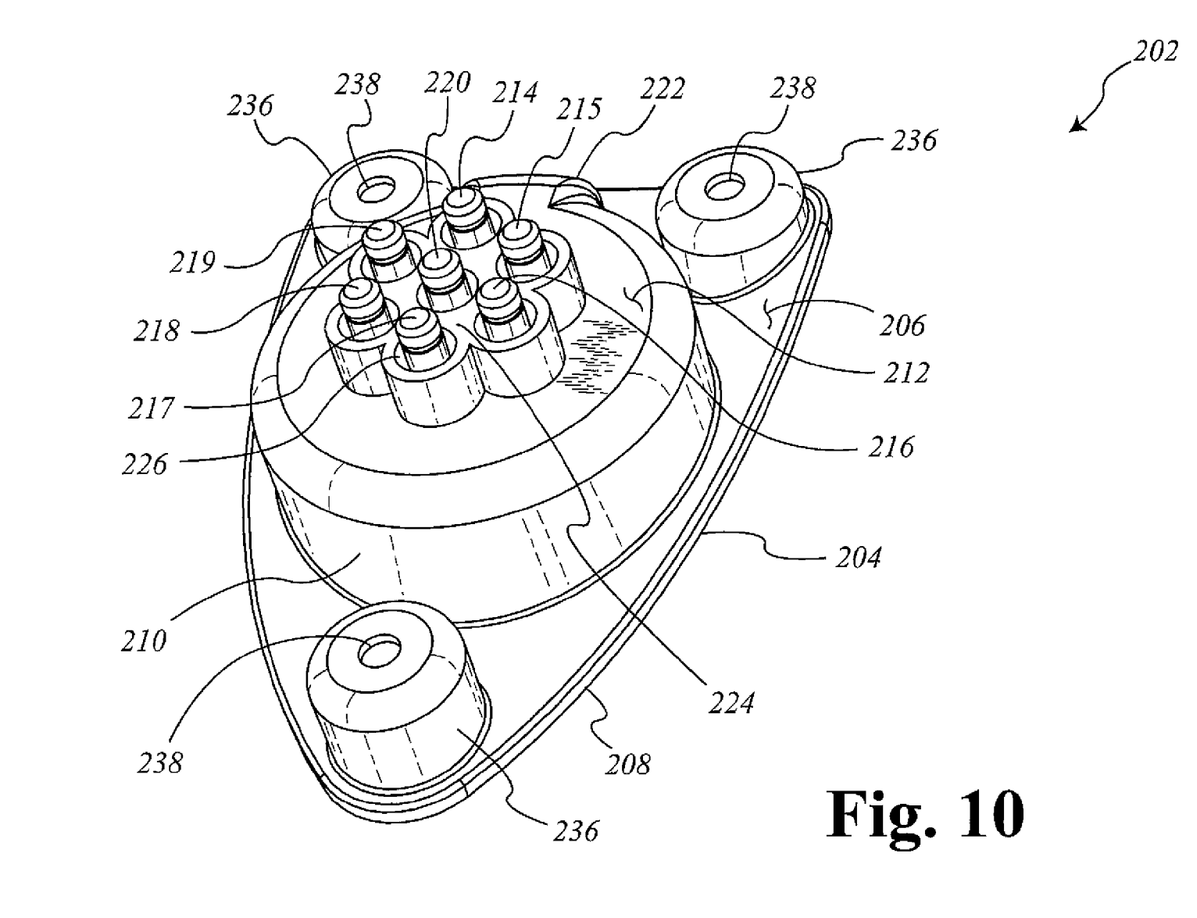
FIG. 10 is a perspective view of a first side of an interchangeable connector assembly of the present disclosure.
Figure 11:
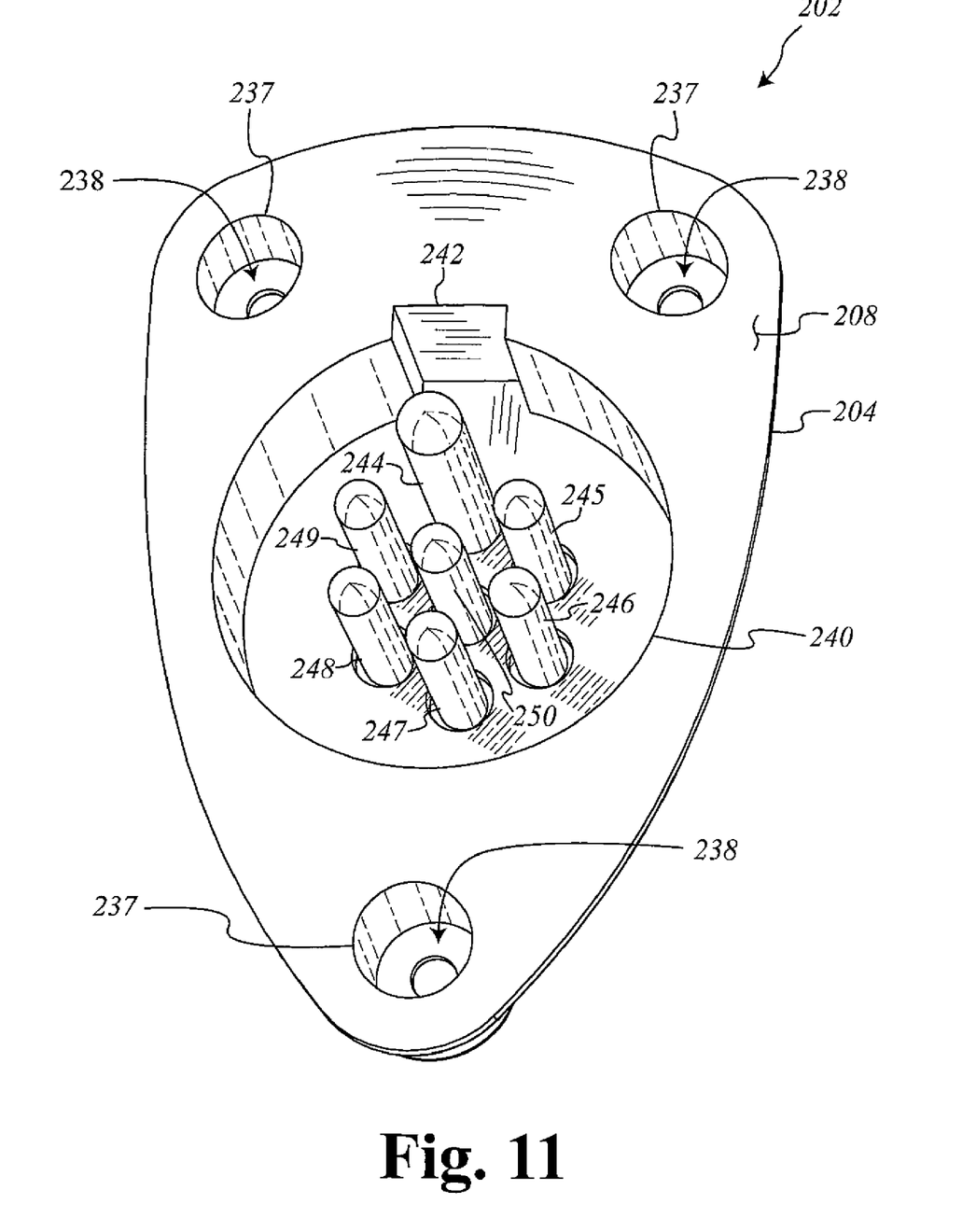
FIG. 11 is a perspective view of a second side of an interchangeable connector assembly of the present disclosure.

FIGS. 10 and 11 illustrate interchangeable connector assembly 202 configured to be detachably mounted to nosebox housing 152 such that the assembly can be easily removed for servicing and exchanging for other connector assemblies. In such circumstances, removing and replacing assembly 202 involves little, if any, disruption to the electrical connections of terminal plate assembly 302. Assembly 202 includes special features designed to meet specific needs of interfacing the electrical systems 56 and 66 (FIG. 1) of the tractor/trailer combination. As illustrated, assembly 202 may be a push-on-sealed plug type of connector assembly. FIGS. 10 and 11 show the exterior features of interchangeable connector assembly 202. As illustrated, assembly 202 is of a one-piece construction, having a plate-like body 204 which includes a first side 206 (see FIG. 10) and a second side 208 (see FIG. 11).

Referring now to FIG. 10, a turret 210 is centrally defined on first side 206 of assembly 202. As illustrated, turret 210 extends above first side 206 and includes a top face 212 and a key projection 222 protruding from the side of turret 210. In the illustrated embodiment, key projection 222 extends from top surface 212 to first side 206. Extending from top face 212 of turret 210 is a raised section 224 which contains seven wells 226. In certain embodiments, the primary conducting pins include distal ends positioned adjacent socket cavity 48 and proximal ends extending into interior space 158 of housing 152. For purposes of the present disclosure, the proximal ends of the primary conducting pins will be referred to as connection pins 214-220. However, it is also contemplated that each primary conducting pin could be two separate pins electrically connected via a connecting conductor. In the illustrated embodiment, the seven connection pins 214-220 extend above raised section 224 from wells 226. Raised section 224 may provide support to the connection pins 214-220, as well as provide support to plug terminals of a wire harness assembly (as will be discussed in greater detail below in connection with FIG. 13), while wells 226 allow adequate access for the plug terminals to contact connection pins 214-220. In the illustrated embodiment, connection pins 214-220 connect with an electrical connecting assembly, such as a wire harness assembly, to electrically connect assembly 202 with assembly 302, as will be explained in greater detail below. In the illustrated embodiment, connection pins 214-220 are adapted to receive conventional push-on-sealed plug terminals and are approximately 0.18 inches in diameter.

A set of mounting bosses 236 are also provided on body 204. Mounting bosses 236 extend from first side 206 and include apertures 238. Apertures 238 are adapted for receiving bolts or screws for attaching interchangeable connector assembly 202 to inside surface 164 of cover member 156 of nosebox housing 152. In the illustrated embodiment, assembly 202 is generally triangular in shape, with mounting bosses 236 being positioned at the corners of the assembly for a generally even distribution of attachment forces.

Referring now to FIG. 11, second side 208 of interchangeable connector assembly 202 is illustrated. Recessed within second side 208 is turret cavity 240 which complements turret 210 defined on first side 206. Extending from turret cavity 240 are the distal ends of the primary conducting pins, which will simply be referred to as primary pins 244-250. The seven primary pins 244-250 are configured as a socket for receiving a SAE-J560b plug connector of a SAE-J1067 cable. While the interchangeable connector assembly 202 as illustrated is adapted to the SAE-J560b interfacing standard, it is to be understood that the present disclosure contemplates providing a connector assembly for push-on-seal plug (or other style) terminals having other than a SAE-J560b configuration.

In the illustrated embodiment where the bridging circuits are configured according to the SAE-J1067 standard, primary pin 244 is slightly larger in diameter than the other six primary pins 245-250 and is conventionally referred to as the white pin for accepting the ground or white circuit. Moving clockwise from primary pin 244 is primary pin 245 for accepting the black circuit, primary pin 246 for accepting the yellow circuit, primary pin 247 for accepting the red circuit, primary pin 248 for accepting the green circuit, primary pin 249 for accepting the brown circuit, and primary pin 250 for accepting the blue circuit. Accordingly, connection pin 214 is an extension of or electrically connected with primary pin 244, thus providing connection to the white circuit; connection pin 219 is an extension of or electrically connected with primary pin 245, thus providing connection to the black circuit; connection pin 218 is an extension of or electrically connected with primary pin 246, thus providing connection to the yellow circuit; connection pin 217 is an extension of or electrically connected with primary pin 247, thus providing connection to the red circuit; connection pin 216 is an extension of or electrically connected with primary pin 248, thus providing connection to the green circuit; connection pin 215 is an extension of or electrically connected with primary pin 249, thus providing connection to the brown circuit; and connection pin 220 is an extension of or electrically connected with primary pin 250, thus providing connection to the blue circuit.

Situated directly behind primary pin 244, on the wall of turret cavity 240, is key slot 242. Key slot 242 complements key projection 222 defined on first side 206. Key slot 242 provides guidance for aligning connector assembly 202 to nosebox housing 152. Spaced apart at the corners of body 204 are recesses 237 with apertures 238, which correspond to mounting bosses 236 with apertures 238 defined on first side 206. Each of the recesses 237 with apertures 238 is adapted for receiving a mounting bolt or screw for selectively mounting interchangeable connector assembly 202 to nosebox housing 152.

After the electrical connections are made between pins 214-220 and pins 244-250, if required, body 204 of interchangeable connector assembly 202 may be formed by insert molding. Insert molding assures a seal over the conductors and the welding joints, and thus reduces the probability of environmental corrosion. Additionally, insert molding allows better control and dimensional stability of the conducting pin locations. Insert molding generally involves assembling pins 214-220, pins 244-250 and the conductors, as needed, into a mold (not shown). A fluid non-conducting molding compound is dispensed into the mold sufficient to cover the conductors and the welded junctions, but allowing connection pins 214-220 and primary pins 244-250 to extend above the molding compound. The molding compound is then cured to a solid stage forming a rigid plate, thereby stabilizing the pin positions and providing protection against moisture intrusion. In certain embodiments, the molding compound may be glass filled nylon. In such cases, the amount of glass may vary depending on the strength and rigidity required. In certain embodiments, the amount of glass is in the range of 20-30%. While insert molding with glass filled nylon is chosen for the illustrated embodiments, other non-conducting, moldable materials having the necessary strength and rigidity may also be used.

Figure 12:
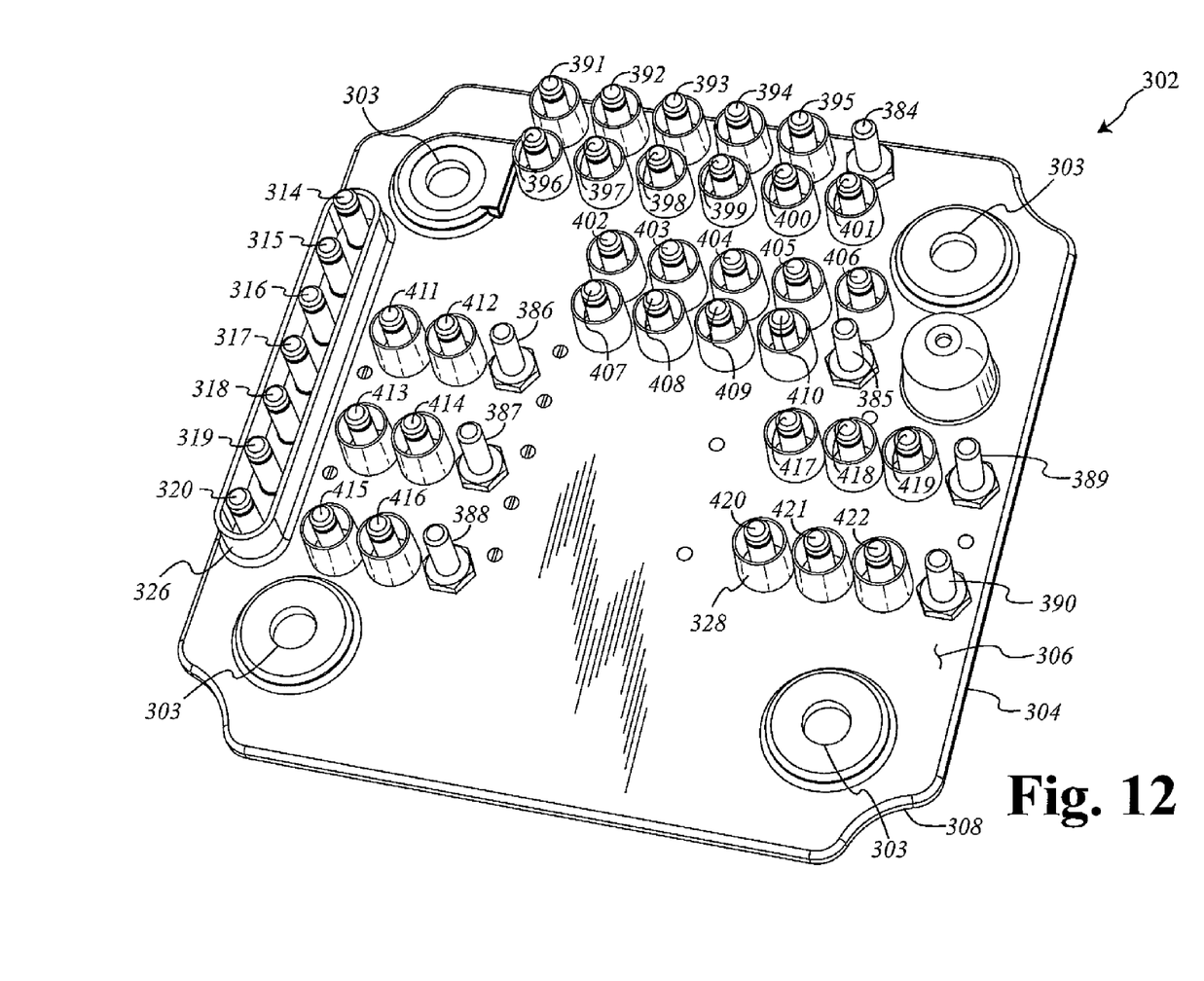
FIG. 12 is a perspective view of a terminal plate assembly of the present disclosure.

Terminal plate assembly 302 is illustrated in FIG. 12. Terminal plate assembly 302 provides additional connecting points for conventional plug and ring-terminal connectors to the electrical circuits, thus eliminating the common but undesirable practice of splicing into the electrical circuit wires. Accordingly, many extra electrical functions may be connected to the seven circuits provided by the SAE-J1067 cable. Assembly 302 has a plate-like body 304 which includes a first side 306 and a second side 308. Extending from first side 306 is a plurality of secondary conducting pins to provide connection with assembly 202 and a plurality of auxiliary conducting pins to provide additional connection points to the electrical circuits bridging the tractor/trailer combination and connected with assembly 202. While the terminal plate assembly 302 as illustrated is adapted to the SAE-J560b interfacing standard, it is to be understood that the present disclosure contemplates providing an assembly for terminals having other than a SAE-J560b configuration.

Well 326 extends up from first side 306 having seven secondary conducting or connection pins 314-320 extending therefrom. Secondary connection pins 314-320 connect with an electrical connecting assembly, such as a wire harness assembly discussed in greater detail below in connection with FIG. 13, which also connects with connection pins 214-220, to electrically connect assemblies 202 and 302. Via the electrical connecting assembly, secondary connection pin 314 is electrically connected with connection pin 214, thus extending connection to the white circuit; secondary connection pin 315 is electrically connected with connection pin 219, thus extending connection to the black circuit; secondary connection pin 316 is electrically connected with connection pin 220, thus extending connection to the blue circuit; secondary connection pin 317 is electrically connected with connection pin 215, thus extending connection to the brown circuit; secondary connection pin 318 is electrically connected with connection pin 216, thus extending connection to the green circuit; secondary connection pin 319 is electrically connected with connection pin 217, thus extending connection to the red circuit; and secondary connection pin 320 is electrically connected with connection pin 218, thus extending connection to the yellow circuit. While the corresponding connection pins are shown for each of the SAE-J1067 circuits, it is contemplated that other connection pins may be paired together for each of the SAE-J1067 circuits. In the illustrated embodiment, connection pins 314-320 are adapted to receive conventional push-on-sealed plug terminals and are approximately 0.18 inches in diameter. Secondary connection pins 314-320 are illustrated as being in a substantially linear pattern; however, it should be appreciated that connection pins 314-320 can be positioned and configured otherwise as would occur to one skilled in the art.

Terminal plate assembly 302 further includes a plurality of auxiliary pins 384-422 extending from first side 306. The auxiliary pins as a group are also referred to as additional conductors. Auxiliary pins 384-422 provide added connection points to the electrical circuits bridging the tractor/trailer combination. In the illustrated embodiment where the bridging circuits are configured according to the SAE-J1067 standard, auxiliary pins 384 and 391-401 are electrically connected with secondary connection pin 314, thus providing connections to the white circuit; auxiliary pins 385 and 402-410 are electrically connected with secondary connection pin 315, thus providing connections to the black circuit; auxiliary pins 386 and 411-412 are electrically connected with secondary connection pin 316, thus providing connections to the blue circuit; auxiliary pins 387 and 413-414 are electrically connected with secondary connection pin 318, thus providing connections to the green circuit; auxiliary pins 388 and 415-416 are electrically connected with secondary connection pin 320, thus providing connections to the yellow circuit; auxiliary pins 389 and 417-419 are electrically connected with secondary connection pin 317, thus providing connections to the brown circuit; and auxiliary pins 390 and 420-422 are electrically connected with secondary connection pin 319, thus providing connections to the red circuit.

Terminal plate assembly 302 includes thirty-two freestanding wells 328 extending up from first side 306, from which auxiliary pins 391-422 extend. In the illustrated embodiment, auxiliary pins 391-422 are adapted to receive conventional push-on-sealed plug terminals. In certain embodiments, auxiliary pins 391-422 are approximately 0.18 inches in diameter. Auxiliary pins 384-390 are adapted to receive conventional ring terminal connectors and are of sufficient height to accommodate a multiple of ring-terminal connectors by stacking. In certain embodiments, auxiliary pins 384-390 are #10 threaded posts for accepting #10 ring-terminals. As such, assembly 302 provides the flexibility of multiple connections, via both ring-terminals and conventional push-on-sealed plug terminals, to the electrical circuits bridging the tractor/trailer combination. While the illustrated number of auxiliary pins 384-422 are provided for each of the SAE-J1067 circuits, it is contemplated that a greater or lesser number of auxiliary pins may be utilized without deviation from the spirit and scope of the invention. Additionally, as stated above, terminal plate assembly 302 may include a plurality of mounting holes 303 configured to align with the plurality of mounting holes 26 defined in back wall 21 of tray member 154 for receiving mounting bolts (not shown) for securing tray member 154 to a tractor or trailer.

Optionally, in certain embodiments, extra connection points to the ground circuit may be provided to give an extra layer of protection to terminal plate assembly 302. As an example, one or more mounting holes 303 receiving a mounting bolt may be electrically connected with the ground circuit to provide an additional grounding pathway for terminal plate assembly 302. In such cases, the one or more grounded mounting holes 303 may be electrically connected with secondary pin 319 and/or auxiliary pins 384 and 391-401 which provide connection to the ground or white circuit. As another example, terminal plate assembly 302 may include a ground cap engaged with at least one of the secondary conducting or auxiliary pins electrically connected with the ground circuit. The ground cap may include a ground contact plate and a plurality of ground pins in electrical contact with the ground contact plate, such that the ground pins provide connection points to the ground circuit. In such cases, the ground contact plate may be electrically connected with the secondary and/or auxiliary pins which provide connection points to the ground or white circuit.

It is also contemplated that terminal plate assembly 302 may optionally include one or more circuit breakers to provide circuit breaker protection to one or more of the corresponding circuits. In certain embodiments, the circuit breakers may be of a conventional style, including first and second terminal posts extending from a breaker body. In such cases, the posts may be electrically connected inside the breaker body via a fusible link which will cause the electrical circuit to open when the connected circuit is overloaded. Additionally, the terminal plate assembly may include sets of contact plates sized to receive the terminal posts of the corresponding circuit breakers to provide connecting points to the electrical circuits bridging the tractor/trailer combination. In such embodiments, connection to the circuits may be made through connections to the terminal posts corresponding to the contact plates. In some embodiments, the posts may be adapted to receive conventional ring-terminal connectors.

Electrical connections between secondary pins 314-320 and auxiliary pins 384-422 (and one or more mounting holes 303 and/or circuit breakers, in certain embodiments) may be made and organized by the use of a variety of possible connecting conductors. In certain embodiments, the electrical connections are made and organized by the use of bar conductors. Pins which are connected to the same bar connectors are electrically connected. It will be appreciated by those skilled in the art that many appropriate processes of producing bar conductors may be used, such as the stamped and formed process as an example. Additionally, bar conductors may be made from a variety of possible conducting materials, including brass as an example. In certain other embodiments, the electrical connections may be made through the use of conductive wires. In addition to bar conductors and wires, other types of connecting conductors are contemplated as would occur to one skilled in the art After the electrical connections are made between secondary connection pins 314-320 and auxiliary pins 384-422, body 304 of terminal plate assembly 302 may be formed by insert molding. As discussed above, insert molding assures a seal to reduce the probability of environmental corrosion, and allows better control and dimensional stability of the pin locations. Insert molding generally involves assembling pins 314-320 and 384-422 and the conductors, as desired, into a mold (not shown). A fluid non-conducting molding compound is dispensed into the mold sufficient to cover the conductors and the welded junctions, but allowing pins 314-320 and 384-422 to extend above the molding compound. The molding compound is then cured to a solid stage forming a rigid plate, thereby stabilizing the pin positions and providing protection against moisture intrusion. In certain embodiments, the molding compound is glass filled nylon. In such cases, the amount of glass may vary depending on the strength and rigidity required. In certain embodiments, the amount of glass is in the range of 20-30%. While insert molding with glass filled nylon is chosen for the illustrated embodiments, other non-conducting, moldable materials having the necessary strength and rigidity may also be used.

Figure 13:
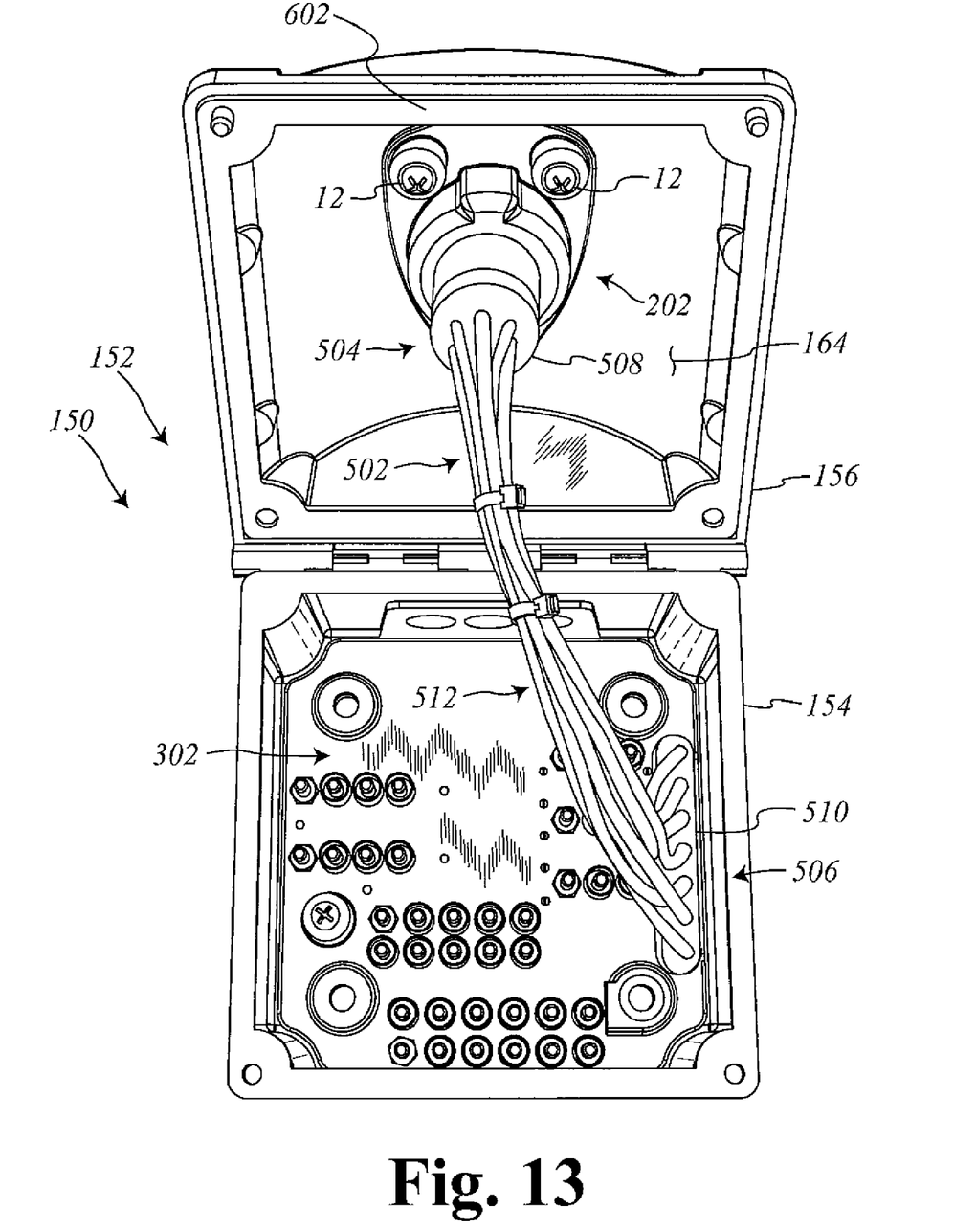
FIG. 13 is yet another perspective view of a nosebox assembly of the present disclosure in an opened position, showing the electrical connecting assembly which electrically connects the primary and second conducting pins.

As mentioned above, an electrical connecting assembly is used to electrically connect interchangeable connector assembly 202 and terminal plate assembly 302. It is contemplated that various types of electrical connecting assemblies, including various types of power cords, may be used which are operable to electrically connect assemblies 202 and 302. As an example, FIG. 13 illustrates a wire harness assembly 502 electrically connecting assembly 202 with assembly 302, providing power to secondary connection pins 314-320 and auxiliary pins 384-422. In the illustrated embodiment, wire harness assembly 502 includes a first plug end 504 configured to connect with primary connection pins 214-220 of assembly 202 and a second plug end 506 configured to connect with secondary connection pins 314-320 of assembly 302.

In certain embodiments, plug end 504 includes a seven conductor plug connector 508 and plug end 506 includes a seven conductor plug connector 510, with a set of seven wires 512 extending therebetween. In the illustrated embodiment, plug connector 508 is an SAE-J560b type connector, and plug connector 510 is an elongated connector with a linear receptacle arrangement. Additionally, in the illustrated embodiment, each of plug connectors 508 and 510 define seven receptacles or electrical terminals (not shown) forming an electrical connection with one of the seven wires within set 512. The sizing and color standard of the seven circuit wires within set 512 are set forth in SAE-J1067. In the illustrated embodiment, the white wire corresponding to the white circuit connects connection pin 214 with secondary connection pin 314; the brown wire corresponding to the brown circuit connects connection pin 215 with secondary connection pin 317; the green wire corresponding to the green circuit connects connection pin 216 with secondary connection pin 318; the red wire corresponding to the red circuit connects connection pin 217 with secondary connection pin 319; the yellow wire corresponding to the yellow circuit connects connection pin 218 with secondary connection pin 320; the black wire corresponding to the black circuit connects connection pin 219 with secondary connection pin 315; and the blue wire corresponding to the blue circuit connects connection pin 220 with secondary connection pin 316.

In the illustrated embodiment, interchangeable connector assembly 202 may be removed and replaced with another connector assembly by removing plug connector 508 from engagement with connection pins 214-220 of assembly 202. Screws 12 may be unscrewed to separate assembly 202 from inside surface 164 of cover member 156. A replacement connector assembly may be mounted to inside surface 164 and plug connector 508 engaged therewith, without disruption to the electrical connections made with auxiliary pins 384-422. It is contemplated that terminal plate assembly 302 may also be removed and replace as desired.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. A nosebox assembly for making electrical connection between a tractor and a trailer, comprising:
   separate first and second members selectively mounted within a nosebox housing, wherein said first member is spaced apart from said second member;
   a plurality of primary conducting pins extending from said first member and configured as a socket, wherein each of said primary conducting pins is adapted to receive connection to a circuit;
   a plurality of secondary conducting pins extending from said second member;
   a plurality of auxiliary pins extending from said second member, wherein each of said auxiliary pins is electrically connected to one of said secondary conducting pins, each of said auxiliary pins being adapted to receive a terminal connector thereby providing an additional electrical connection point to said circuits received by said primary conducting pins; and
   an electrical connecting assembly electrically connecting said primary conducting pins and said secondary conducting pins.

2. The assembly of claim 1, further comprising a nosebox housing having a cover member and a tray member, wherein said first member is mounted to one of said cover member and said tray member, and said second member is mounted to the other of said cover member and said tray member.

3. The assembly of claim 1, wherein said first member is an interchangeable connector and said second member is a terminal plate.

4. The assembly of claim 1, wherein said first member includes first and second opposite sides, wherein said plurality of primary conducting pins each include a distal end and a proximal end, wherein said distal ends extend from said first side and are configured as a socket adapted to receive a SAE-J560b plug, whereby each of said primary conducting pins receives connections to one of seven circuits, namely, white, black, yellow, red, green, brown and blue according to a SAE-J1067 convention, wherein said proximal ends extend from said second side.

5. The assembly of claim 4, wherein said electrical connecting assembly includes a wire harness assembly, said wire harness assembly having first and second ends with first and second plugs, respectively, said first plug making electrical connection with said primary ends of said primary conducting pins and said second plug making electrical connection with said secondary conducting pins.

6. The assembly of claim 1, wherein the number of said plurality of auxiliary pins exceeds the number of said plurality of primary conducting pins.

7. The assembly of claim 1, wherein each of said plurality of primary conducting pins is electrically connected to at least one of said plurality of secondary conducting pins and at least one of said plurality of auxiliary pins.

8. The assembly of claim 1, wherein electrical connections between said secondary conducting pins and said auxiliary pins are made through bar conductors, and wherein said secondary conducting pins and said auxiliary pins are insert welded to said bar conductors.

9. The assembly of claim 1, wherein said plurality of auxiliary pins includes at least one terminal threaded post designed for accepting multiple ring terminals in a stacking configuration to provide an additional electrical connection point and at least one terminal pin designed to accept push-on plugs to provide an additional electrical connection point.

10. A nosebox assembly for making electrical connection between a tractor and a trailer, comprising:
   a nosebox housing defining an interior space;
   a plurality of primary conducting pins at least partially disposed within said interior space and configured as a socket, wherein each of said primary conducting pins is adapted to receive connection to a circuit;
   a plurality of secondary conducting pins disposed within said interior space;
   an electrical connecting assembly electrically connecting said primary conducting pins and said secondary conducting pins;
   a plurality of auxiliary pins disposed within said interior space, wherein each of said auxiliary pins is electrically connected to one of said secondary conducting pins, wherein each of said auxiliary pins is adapted to receive a terminal connector thereby providing an additional electrical connection point to said circuits received by said primary conducting pins;
   wherein said auxiliary pins are remotely positioned from said primary conducting pins within said interior space such that replacement of said primary conducting pins occurs without disruption to electrical connections made with said auxiliary pins and without removal of said auxiliary pins from said interior space.

11. The assembly of claim 10, further comprising an interchangeable connector and a terminal plate, said connector and said plate being selectively mounted to said nosebox housing, wherein said plurality of primary conducting pins extends from said interchangeable connector, wherein said plurality of secondary conducting pins and said plurality of auxiliary pins extend from said terminal plate.

12. The assembly of claim 11, wherein said nosebox housing includes a cover member hingeably engaged with a tray member, wherein said interchangeable connector is mounted to said cover member and said terminal plate is mounted to said tray member.

13. The assembly of claim 10, wherein the number of said plurality of auxiliary pins exceeds the number of said plurality of primary conducting pins.

14. The assembly of claim 10, wherein said auxiliary pins include at least one terminal threaded post designed for accepting multiple ring terminals in a stacking configuration to provide an additional electrical connection point, and at least one terminal pin designed to accept push-on plugs to provide an additional electrical connection point.

15. The assembly of claim 10, wherein each of said primary conducting pins includes a distal end and a proximal end, wherein said distal ends are configured as a socket adapted to receive a SAE-J560b plug, whereby each of said primary conducting pins receives connections to one of seven circuits, namely, white, black, yellow, red, green, brown and blue according to a SAE-J1067 convention.

16. The assembly of claim 15, wherein said electrical connecting assembly includes a wire harness assembly, said wire harness assembly having first and second ends with first and second plugs, respectively, said first plug making electrical connection with said proximal ends of said primary conducting pins and said second plug making electrical connection with said secondary conducting pins.

17. A nosebox assembly for making electrical connection between a tractor and a trailer, comprising:
   a connector having a first side forming a socket portion for receiving an electrical connector plug having a plurality of plug conductors, said connector having a second opposite side;
   a plurality of primary conducting pins, each of said primary conducting pins having a primary distal end and a primary proximal end, wherein each of said primary distal ends is positioned within said socket portion for mating with an electrical connector plug having a plurality of plug conductors, and wherein each of said primary proximal ends extends from said second side;
   a secondary member mounted apart from said connector;
   a plurality of secondary conducting pins extending from said secondary member;
   a plurality of auxiliary pins extending from said secondary member, each of said auxiliary pins being electrically connected to one of said secondary conducting pins;
   an electrical connecting assembly electrically connecting said primary conducting pins and said secondary conducting pins, wherein each of said plurality of secondary conducting pins and each of said plurality of auxiliary pins is in electrical connection with at least one of said primary conducting pins;
   wherein when an electrical connector plug having a plurality of plug conductors is received in said socket portion, each plug conductor is electrically connected to at least one primary conducting pin, at least one secondary conducting pin, and at least one auxiliary pin.

18. The assembly of claim 17, wherein said connector is interchangeable.

19. The assembly of claim 17, further comprising a nosebox housing having a cover member and a tray member, wherein said interchangeable connector is mounted to said cover member and said secondary member is mounted to said tray member.

20. The assembly of claim 19, wherein said secondary member is a terminal plate formed by insert molding with a non-conducting molding compound.

21. The assembly of claim 17, wherein said electrical connecting assembly includes a wire harness assembly, said wire harness assembly having first and second ends, a first plug at said first end for making electrical connection with said proximal ends of said primary conducting pins and a second plug at said second end for making electrical connection with said secondary conducting pins.

22. The assembly of claim 17, wherein the number of said plurality of auxiliary pins exceeds the number of said plurality of primary conducting pins.

23. The assembly of claim 17, wherein said auxiliary pins include at least one terminal threaded post designed for accepting multiple ring terminals in a stacking configuration to provide an additional electrical connection point and at least one terminal pin designed to accept push-on plugs to provide an additional electrical connection point.

24. The assembly of claim 17, wherein said distal ends of said primary conducting pins are configured as a socket adapted to receive a SAE-J560b plug, whereby each of said primary conducting pins receives connections to one of seven circuits, namely, white, black, yellow, red, green, brown and blue according to a SAE-J1067 convention.

* * * * *